(12) United States Patent
Hu et al.

(10) Patent No.: US 12,091,473 B2
(45) Date of Patent: Sep. 17, 2024

(54) THERMOPLASTIC PARTICULATES COATED WITH POLYMER NANOPARTICLES AND METHODS FOR PRODUCTION AND USE THEREOF

(71) Applicant: Xerox Corporation, Norwalk, CT (US)

(72) Inventors: Nan-Xing Hu, Oakville (CA); Kimberly D. Nosella, Ancaster (CA); Richard Philip Nelson Veregin, Mississauga (CA); Yulin Wang, Oakville (CA); Raysa Rodriguez Diaz, Burlington (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/330,024

(22) Filed: Jun. 6, 2023

(65) Prior Publication Data

US 2023/0322982 A1    Oct. 12, 2023

Related U.S. Application Data

(63) Continuation of application No. 17/086,553, filed on Nov. 2, 2020, now Pat. No. 11,708,436.

(51) Int. Cl.
*C08F 120/40* (2006.01)
*C08K 3/36* (2006.01)
*B82Y 99/00* (2011.01)

(52) U.S. Cl.
CPC .............. *C08F 120/40* (2013.01); *C08K 3/36* (2013.01); *B82Y 99/00* (2013.01)

(58) Field of Classification Search
CPC .......... C08F 120/40; C08K 3/36; B82Y 99/00
USPC ....................................................... 524/560
See application file for complete search history.

(56) References Cited

U.S. PATENT DOCUMENTS

2019/0135991 A1*    5/2019    Lin ........................... C08J 3/126

\* cited by examiner

*Primary Examiner* — Hui H Chin
(74) *Attorney, Agent, or Firm* — Vorys, Sater, Seymour and Pease LLP

(57) ABSTRACT

Additive manufacturing processes featuring consolidation of thermoplastic particulates may form printed objects in a range of shapes. Inorganic nanoparticles disposed upon the outer surface of the thermoplastic particulates may improve flow performance of the thermoplastic particulates during additive manufacturing, but may be undesirable to incorporate in some printed objects. Polymer nanoparticles may be substituted for inorganic nanoparticles in some instances to address this difficulty and provide other advantages. Particulate compositions suitable for additive manufacturing may comprise: a plurality of thermoplastic particulates comprising a thermoplastic polymer and a plurality of polymer nanoparticles disposed upon an outer surface of the thermoplastic particulates, the polymer nanoparticles comprising a crosslinked fluorinated polymer.

19 Claims, 5 Drawing Sheets

THERMOPLASTIC PARTICULATES COATED WITH POLYMER NANOPARTICLES AND METHODS FOR PRODUCTION AND USE THEREOF

FIELD

The present disclosure generally relates to additive manufacturing, more particularly additive manufacturing processes featuring consolidation of powder particulates coated with nanoparticles.

BACKGROUND

Additive manufacturing, also known as three-dimensional (3-D) printing, is a rapidly growing technology area. Although additive manufacturing has traditionally been used for rapid prototyping activities, this technique is being increasingly employed for producing commercial and industrial parts (printed objects) in any number of complex shapes. Additive manufacturing processes operate by layer-by-layer deposition of either 1) a stream of molten printing material or a liquid precursor to a printing material, or 2) powder particulates of a printing material. The layer-by-layer deposition usually takes place under control of a computer to deposit and consolidate the printing material in precise locations based upon a digital three-dimensional computer-aided design model ("blueprint") of the part to be manufactured. Powder bed fusion (PBF) of powder particulates is an especially beneficial additive manufacturing method. In a particular example, consolidation of powder particulates may take place in a powder bed deposited layer-by-layer using a three-dimensional printing system that employs a laser or electron beam to heat precise locations of the powder bed, thereby consolidating specified powder particulates to form a part having a predetermined shape. Selective laser sintering (SLS) represents a particular example of a process suitable for promoting localized consolidation of powder particulates during powder bed fusion to form a part in a desired shape. Other localized heating techniques for particulate consolidation that may be similarly employed include, for example, electron beam melting (EBM), binder jetting, multi-jet fusion (MJF), and selective heat melting (SHM).

Among the powder particulates suitable for use in three-dimensional printing are those comprising thermoplastic polymers. Although a wide array of thermoplastic polymers are known, there are relatively few having properties compatible for use in current three-dimensional printing techniques employing particulate consolidation. Thermoplastic polymers suitable for undergoing particulate consolidation into parts may include those having a significant difference between the onset of melting and the onset of crystallization, which may promote good structural and mechanical integrity following directed heating to promote particulate consolidation. Ready formation of particulates suitable for undergoing deposition in a powder bed is another significant consideration.

For satisfactory printing performance to be realized, thermoplastic particulates need to maintain good flow properties in the solid state. Flow properties may be evaluated, for example, by measuring the fraction of thermoplastic particulates from a sample that are able to pass through a standard sieve of a specified size and/or by measuring of the angle of repose. High fractions of sievable thermoplastic particulates may be indicative of the thermoplastic particulates existing as non-agglomerated, substantially individual particulates, which may be characteristic of ready powder flow. Lower values of the angle of repose, in contrast, may be characteristic of ready powder flow. A relatively narrow particle size distribution and regularity of the particulate shape in a sample may also facilitate good powder flow performance. Substantial absence of particulate fines may also be desirable for promoting powder flow.

Thermoplastic particulates are oftentimes obtained commercially by cryogenic grinding or precipitation processes, which may result in irregular particulate shapes and wide particle size distributions. Irregular particulate shapes and wide particle size distributions may also result in poor powder flow performance, as well as extensive void formation during three-dimensional printing processes. Poor powder flow performance may be addressed to some degree through dry blending with fillers and flow aids, but these additives may have limited effectiveness with softer polymer materials, such as elastomers, due to particulate aggregation. In addition, fillers and flow aids may be undesirable to incorporate in printed objects in some instances.

Void formation resulting from irregular particulate shapes may be more difficult to address. Extensive void formation during particulate consolidation may significantly decrease the ultimate material strength of a printed object compared to that otherwise obtainable through casting or machining of the same thermoplastic polymer. Therefore, it can be desirable for good flow performance to be realized once thermoplastic particulates have been liquefied in order to promote adequate particulate consolidation with limited void formation.

Thermoplastic particulates may also be formed by melt emulsification processes, such as those described in U.S. Pat. No. 4,863,646, which is incorporated herein by reference in its entirety. In melt emulsification processes, a thermoplastic polymer is dispersed as liquefied droplets in a carrier fluid, in which the thermoplastic polymer has no or minimal solubility above the polymer's melting point or softening temperature. Upon cooling the liquefied droplets below the melting point or softening temperature, thermoplastic particulates having a substantially spherical shape may be formed, albeit with a wide particle size distribution. As such, the thermoplastic particulates produced in conventional melt emulsification processes may remain non-ideally suited for three-dimensional printing processes.

The particle size distribution of thermoplastic particulates formed during melt emulsification can be narrowed significantly by incorporating a plurality of nanoparticles into the carrier fluid, as described in U.S. patent application Ser. No. 16/946,622, filed on Jun. 30, 2020 and incorporated herein by reference. Various types of silica nanoparticles and other inorganic nanoparticles may be particularly desirable in this regard. Thermoplastic particulates formed in this manner may feature at least a partial coating of nanoparticles upon the particulate surface, wherein the nanoparticles are robustly adhered to and/or embedded in the particulate surface. The adhered/embedded nanoparticles may promote much better powder flow performance than that obtained when dry blending a flow aid with uncoated thermoplastic particulates. The narrow particle size distribution of thermoplastic particulates having a nanoparticle coating thereon may allow ready sintering with a manageable amount of void formation to be realized in many instances. Although a wide range of printed objects may be formed satisfactorily with silica-coated thermoplastic particulates, there are certain instances where incorporation of silica or other inorganic nanoparticles in a printed object may be undesirable. For example, excessive silica or inorganic nanoparticles may compromise the mechanical performance of a printed object in some instances. Polymer nanoparticles may be a satisfactory replacement for silica and other inorganic nanoparticles, but there are few types of polymer nanoparticles that are readily formable, are compatible with melt emulsification conditions, and promote good flow performance and limit void formation during additive manufacturing.

SUMMARY

The present disclosure provides particulate compositions suitable for additive manufacturing. The particulate compositions comprise: a plurality of thermoplastic particulates comprising a thermoplastic polymer, and a plurality of polymer nanoparticles disposed upon an outer surface of the thermoplastic particulates, the polymer nanoparticles comprising a crosslinked fluorinated polymer.

The present disclosure also provides methods for forming consolidated parts using the particulate compositions. The methods comprise: providing a particulate composition comprising a plurality of thermoplastic particulates comprising a thermoplastic polymer, and a plurality of polymer nanoparticles disposed upon an outer surface of the thermoplastic particulates, the polymer nanoparticles comprising a crosslinked fluorinated polymer; depositing the particulate composition layer-by-layer in a powder bed; and heating a portion of the powder bed to consolidate a portion of the thermoplastic particulates into a consolidated part having a specified shape. The consolidated parts may comprise a thermoplastic matrix formed by consolidation of thermoplastic particulates; and polymer nanoparticles admixed with the thermoplastic matrix.

The present disclosure also provides methods for forming particulate compositions suitable for additive manufacturing. The methods comprise: combining a thermoplastic polymer and polymer nanoparticles with a carrier fluid at a heating temperature at or above a melting point or softening temperature of the thermoplastic polymer and below a melting point, softening temperature or decomposition temperature of the polymer nanoparticles; wherein the thermoplastic polymer and the polymer nanoparticles are substantially immiscible in the carrier fluid at the heating temperature, and the polymer nanoparticles comprise a crosslinked fluorinated polymer; applying sufficient shear to disperse the thermoplastic polymer as liquefied droplets in the carrier fluid at the heating temperature in the presence of the polymer nanoparticles; after liquefied droplets have formed, cooling the carrier fluid to at least a temperature at which thermoplastic particulates in a solidified state form, the thermoplastic particulates comprising the thermoplastic polymer and at least a portion of the polymer nanoparticles disposed upon an outer surface of the thermoplastic particulates; and separating the thermoplastic particulates from the carrier fluid.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
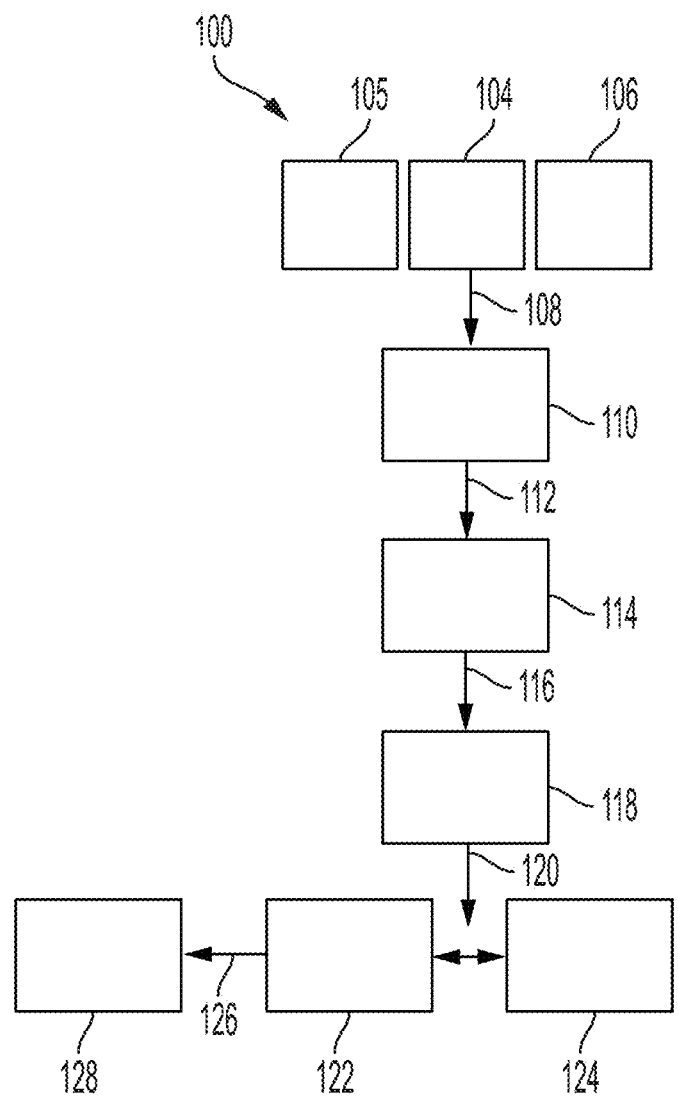
FIG. 1 is a flow chart of a non-limiting example method for producing thermoplastic particulates in accordance with the present disclosure.

The present disclosure generally relates to additive manufacturing, more particularly additive manufacturing processes featuring consolidation of powder particulates having enhanced sintering properties.

As discussed above, thermoplastic particulates comprising a thermoplastic polymer may be suitable for use in three-dimensional printing processes, particularly those employing selective laser sintering and similar processes to consolidate specified locations of a powder bed to form a part having a predetermined shape. Commercially sourced thermoplastic particulates presently may be obtained in irregular shapes and/or with wide particle size distributions, which may lead to poor flow performance and/or incomplete particulate consolidation during printing. Melt emulsification processes employing silica and other inorganic nanoparticles during thermoplastic particulate formation may afford thermoplastic particulates having high sphericity and narrow particle size distributions, which may afford improved powder flow performance and particulate consolidation properties. Although silica and other inorganic nanoparticles usually may be suitably incorporated into printed objects, there are certain instances in which incorporation of such nanoparticles may be unfavorable or lead to ineffective particulate consolidation. There may be a small concentration window effective for incorporating silica or other inorganic nanoparticles in thermoplastic particulates in a suitable amount for forming a desired particle size range while still allowing effective particulate consolidation to take place. Accordingly, it may be very difficult in some cases to strike a balance between adequate powder flow performance and good liquid flow performance when consolidating thermoplastic powder particulates stabilized with silica or other inorganic nanoparticles.

Polymer nanoparticles may represent a suitable substitute for silica and other inorganic nanoparticles, since polymer nanoparticles may be more readily compatible with the polymer matrix of a printed object following particulate consolidation. However, there are comparatively few types of polymer nanoparticles that may be suitably formed and subsequently isolated (e.g., as a latex emulsion, followed by isolation of the emulsion particles), are compatible with melt emulsification conditions (e.g., polymers that are insoluble in a melt emulsification carrier fluid and do not melt or decompose up to the melt emulsification temperature employed), and are capable of effectively promoting powder flow to limit void formation during particulate consolidation. According to the present disclosure, crosslinked fluorinated polymers, particularly crosslinked fluorinated acrylic polymers, may surprisingly fulfill all of these desirable attributes, as discussed in further detail below. A wide range of compositional diversity may be accommodated in crosslinked fluorinated acrylic polymers, including incorporation of non-fluorinated ethylenically unsaturated monomers and/or varying the crosslinking density to promote tailoring of the physical properties of the polymer nanoparticles.

Both crosslinking and fluorination are believed to be desirable for facilitating compatibility with melt emulsification conditions according to the disclosure herein. For example, crosslinked acrylic polymers that are non-fluorinated may undergo decomposition at a temperature below that commonly employed during melt emulsification, thereby precluding their ability to promote stabilization of thermoplastic particulates. Non-crosslinked polymers may similarly undergo decomposition and/or melt at the temperatures commonly employed during melt emulsification. While various fluorinated polymers having high thermal stability are known (e.g., polytetrafluoroethylene), effective emulsification techniques for producing these types of polymers in nanoparticle form are not believed to be known at present.

In some instances, a combination of crosslinked fluorinated polymer nanoparticles and silica nanoparticles or other inorganic nanoparticles may be employed in the disclosure herein. For example, the crosslinked fluorinated polymer nanoparticles may be used in an effective amount to decrease the amount of silica or inorganic nanoparticles to a level that remains effective during melt emulsification but does not become problematic during particulate consolidation. Such approaches may be more cost-effective than complete replacement of silica or inorganic nanoparticles with crosslinked fluorinated polymer nanoparticles, as discussed herein. It is to be appreciated, however, that complete replacement of silica or other inorganic nanoparticles with polymer nanoparticles may be more desirable in some instances.

Terms used in the description and claims herein have their plain and ordinary meaning, except as modified by the paragraphs below.

As used herein, the term "thermoplastic polymer" refers to a polymer material that softens and hardens reversibly on heating and cooling above a specified temperature (e.g., melting point, softening point, glass transition temperature, or the like). Thermoplastic polymers encompass both elastomeric and non-elastomeric thermoplastic polymers.

As used herein, the term "polymer" refers to an oligomeric material formed from one or more organic monomers.

As used herein, the term "nanoparticle" refers to a particulate material having a particle size ranging from about 1 nm to about 500 nm.

As used herein, the term "oxide" refers to both metal oxides and non-metal oxides. For purposes of the present disclosure, silicon is considered to be a metal.

As used herein, the term "oxide nanoparticles" refers to a particulate material having a particle size ranging from about 1 nm to about 500 nm and comprising a metal oxide or a non-metal oxide.

As used herein, the term "inorganic nanoparticles" refers to any nanoparticles that are not polymer nanoparticles.

As used herein, the term "associated" refers to chemical bonding, physical admixture with a matrix, or physical adherence to a surface.

As used herein, the terms "admixed," "admixture" or like related terms refer to dissolution of a first substance in a second substance or dispersion of a first substance as a solid in a second substance, wherein the dispersion may be uniform or non-uniform.

As used herein, the term "$D_{10}$" refers to a diameter at which 10% of the sample (on a volume basis unless otherwise specified) is comprised of particles having a diameter less than said diameter value. As used herein, the term "$D_{50}$" refers to a diameter at which 50% of the sample (on a volume basis unless otherwise specified) is comprised of particles having a diameter less than said diameter value. $D_{50}$ may also be referred to as the "average particle size." As used herein, the term "$D_{90}$" refers to a diameter at which 90% of the sample (on a volume basis unless otherwise specified) is comprised of particles having a diameter less than said diameter value.

As used herein, the terms "diameter span," "span" and "span size" provide an indication of the breadth of a particle size distribution and is calculated as $(D_{90}-D_{10})/D_{50}$ (again, each D-value is based on volume, unless otherwise specified).

As used herein, the term "shear" refers to stirring or a similar process that induces mechanical agitation in a fluid.

As used herein, the term "embed" relative to nanoparticles and a surface of a thermoplastic particulate refers to the nanoparticles being at least partially extended into the surface such that polymer is in contact with the nanoparticles to a greater degree than would occur if the nanoparticles were simply laid on the surface, thereby contacting the surface tangentially.

As used herein, the terms "circularity" and "sphericity" refer to how close a particulate or a plurality of particulates is to a perfect sphere. To determine circularity, optical microscopy images are taken of the particulates. The perimeter (P) and area (A) of a particulate in the plane of the microscopy image is calculated (e.g., using a SYSMEX FPIA 3000 particle shape and particle size analyzer, available from Malvern Instruments). The circularity of a particulate is CEA/P, where CEA is the circumference of a circle having the area equivalent to the area (A) of the actual particulate.

As used herein, the viscosity of carrier fluids refer to the kinematic viscosity at 25° C., unless otherwise specified, and are measured per ASTM D445-19, unless otherwise specified.

The melting point of a thermoplastic polymer herein, unless otherwise specified, is determined by ASTM E794-06(2018) with 10° C./min ramping and cooling rates.

The softening temperature or softening point of a thermoplastic polymer herein, unless otherwise specified, is determined by ASTM D6090-17. The softening temperature can be measured by using a cup and ball apparatus available from Mettler-Toledo using a 0.50 gram sample with a heating rate of 1° C./min.

As used herein, the term "fluorinated" refers to a polymer or a monomer unit thereof that contains at least one fluorine atom covalently bonded thereto.

As used herein, the term "perfluorinated" refers to a polymer or a monomer unit thereof having all available hydrogen atoms of a particular type substituted with fluorine atoms.

As used herein, the term "crosslinked" refers to a polymeric material having a group covalently bridging between two different monomer units. Crosslinking may be internal within a given polymer chain (intramolecular), between two or more different polymer chains (intermolecular), or any combination thereof.

As used herein, the term "(meth)acrylic monomer" refers to a family of monomers comprising acrylic acid, methacrylic acid, or a derivative form thereof. Suitable derivative forms of (meth)acrylic monomers may include esters or amides. Thus, for any particular (meth)acrylic monomer disclosed herein, both the acrylic and methacrylic forms are expressly disclosed.

As used herein, the terms "latex," "latex emulsion" and "latex dispersion" refer equivalently to an aqueous emulsion comprising emulsified polymer particulates.

Accordingly, particulate compositions of the present disclosure may comprise a plurality of thermoplastic particulates comprising a thermoplastic polymer, and a plurality of polymer nanoparticles disposed upon an outer surface of the thermoplastic particulates. The polymer nanoparticles comprise a crosslinked fluorinated polymer, suitable examples of which are discussed in further detail below.

Suitable crosslinked fluorinated polymers may comprise at least one fluorinated monomer and at least one crosslinking agent, at least one non-fluorinated monomer and at least one fluorinated crosslinking agent, at least one fluorinated monomer and at least one fluorinated crosslinking agent, or any combination thereof. Particularly suitable crosslinked fluorinated polymers may be formed through polymerization of at least one ethylenically unsaturated monomer, especially a (meth)acrylic monomer, and at least one crosslinking agent bearing two or more ethylenic unsaturations. At least one of the at least one ethylenically unsaturated monomer and the at least one crosslinking agent may be fluorinated. More specific examples of suitable crosslinked fluorinated polymers may include those formable through emulsion polymerization, which may allow the fluorinated crosslinked polymer to be readily isolated as polymer nanoparticles following solvent removal from the emulsion (e.g., through spray drying). Suitable emulsion polymerization reaction conditions are specified in more detail below.

More specific examples of crosslinked fluorinated polymers suitable for forming polymer nanoparticles may comprise a fluorinated (meth)acrylic monomer, particularly a fluorinated (meth)acrylic ester monomer, and a divinyl crosslinker. 2,2,2-Trifluoromethyl (meth)acrylate and divinylbenzene represent an illustrative pairing of fluorinated (meth)acrylic monomer and divinyl crosslinker. Some or other examples of crosslinked fluorinated polymers may comprise a fluorinated (meth)acrylic monomer including, but not limited to, pentafluorophenyl (meth)acrylate, 2,4,6-trifluorophenyl (meth)acrylate, 2,2,3,3,3-pentafluoropropyl (meth)acrylate, perfluoropropyl (meth)acrylate, 1,1,1,3,3,3-hexafluoroisopropyl (meth)acrylate, perfluoroisopropyl (meth)acrylate, 2,2,2-trifluoroethyl (meth)acrylate, 2,2,3,3,4,4,4-heptafluorobutyl (meth)acrylate, 2,2,3,3,4,4-hexafluorobutyl (meth)acrylate, 2,2,3,4,4,4-hexafluorobutyl (meth)acrylate, perfluorobutyl (meth)acrylate, 2,2,3,3,4,4,5,5-octafluoropentyl (meth)acrylate, 2,2,3,3,4,4,5,5,5-nonafluoropentyl (meth)acrylate, perfluoropentyl (meth)acrylate, 3,3,4,4,5,5,6,6,6-nonafluorohexyl (meth)acrylate, 2,2,3,3,4,4,5,5,6,6,7,7-dodecafluoroheptyl (meth)acrylate, 3,3,4,4,5,5,6,6,7,7,8,8,8-tridecafluorooctyl (meth)acrylate, 3,3,4,4,5,5,6,6,7,7,8,8,9,9,10,10,10-heptafluorodecyl (meth)acrylate, octafluoropentyl (meth)acrylate, 3,3,4,4,5,5,6,6,7,7,8,8,9,9,10,10,11,11,12,12-heneicosafluorododecyl (meth)acrylate, 2-[1',1',1'-tifluoro-2'-(trifluoromethyl)-2'-hydroxy)propyl]-3-norbornyl (meth)acrylate, perfluorocyclohexyl (meth)acrylate, 1H,1H,2H,2H-heptadecafluorodecyl methacrylate, 2,2,3,3-tetrafluoropropyl (meth)acrylate, 2-[(1',1',1'-trifluoro-2'-(trifluoromethyl)-2'-hydroxy)propyl]-3-norbornyl (meth)acrylate, any combination thereof, and the like. The corresponding amide forms of the foregoing (meth)acrylic monomers may be employed in some instances.

Any of the foregoing fluorinated (meth)acrylic monomers may be crosslinked with a divinyl crosslinker, such as divinylbenzene or other suitable crosslinker containing at least two vinyl groups. Crosslinkers suitable for promoting crosslinking of ethylenically unsaturated monomers, particularly fluorinated (meth)acrylic monomers, may include, but are not limited to, diethyleneglycol di(meth)acrylate, triethyleneglycol di(meth)acrylate, tetraethyleneglycol di(meth)acrylate, polyethyleneglycol di(meth)acrylate, 1,6-hexanediol di(meth)acrylate, neopentylglycol di(meth)acrylate, tripropyleneglycol di(meth)acrylate, polypropyleneglycol di(meth)acrylate, 2,2'-bis(4-((meth)acryloxy/diethoxy)phenyl)propane, trimethylolpropane tri(meth)acrylate, tetramethylolmethane tetra(meth)acrylate, 1,3-butyleneglycol di(meth)acrylate, neopentylglycol di(meth)acrylate, polypropyleneglycol di(meth)acrylate, 2,2'-bis(4-((meth)acryloxy/polyethoxy)phenyl)propane, divinylbenzene, divinylnaphthalene, divinyl ether, any combination thereof, and the like. Dienes such as 1,3-butadiene and isoprene may comprise a suitable crosslinker in some instances.

In addition, the crosslinker may be fluorinated to produce a suitable crosslinked fluorinated polymer. A fluorinated crosslinker may be utilized to crosslink a fluorinated polymer (e.g., a polymer comprising a fluorinated monomer, such as a fluorinated (meth)acrylic monomer) or a polymer that is otherwise unfluorinated. Suitable fluorinated crosslinking agents may include fluorinated divinyl crosslinking agents such as, for example, 1,8-divinylperfluorooctane, 1,6-divinylperfluorohexane, and 1,4-divinylperfluorobutane.

The mole ratio of the crosslinker containing at least two vinyl groups, such as divinylbenzene, may be chosen to provide a desired crosslinking density in the crosslinked fluorinated polymers disclosed herein. The crosslinking density may be selected to alter the melting point or decomposition temperature of the polymer nanoparticles, for example. In non-limiting examples, the crosslinker, such as a divinyl crosslinker, may be present in an amount ranging from about 1 mol. % to about 50 mol. % relative to total monomers undergoing polymerization to form polymer nanoparticles according to the disclosure herein. In more specific instances, the amount of crosslinker may range from about 1 mol. % to about 10 mol. %, or about 10 mol. % to about 25 mol. %, or about 25 mol. % to about 40 mol. %, or about 40 mol. % to about 50 mol. %.

Commercial divinylbenzene may contain up to about 30 wt. % divinylbenzene and up to about 50 wt. % ethylvinylbenzene. Ethylvinylbenzene does not contain two vinyl groups to promote crosslinking, but it may undergo copolymerization with an ethylenically unsaturated monomer, such as the fluorinated (meth)acrylic monomers specified above. As such, particular fluorinated crosslinked polymers of the present disclosure may comprise fluorinated (meth)acrylic monomers copolymerized with ethylvinylbenzene monomers, wherein at least a portion of the fluorinated (meth)acrylic monomers and/or the ethylvinylbenzene monomers are further crosslinked with divinylbenzene.

Accordingly, the crosslinked fluorinated polymers of the present disclosure, such as a crosslinked fluorinated polymer comprising a fluorinated (meth)acrylic monomer and a divinylbenzene crosslinker, may further comprise an ethylenically unsaturated co-monomer differing from the fluorinated (meth)acrylic monomer. The ethylenically unsaturated co-monomer may be fluorinated or non-fluorinated. The ethylenically unsaturated co-monomer may be ethylvinylbenzene in some embodiments.

Other suitable examples of ethylenically unsaturated monomers that may undergo copolymerization with a fluorinated (meth)acrylic monomer and a divinyl crosslinker are not considered to be particularly limited, provided that polymer nanoparticles may be formed therefrom through emulsion polymerization. Suitable ethylenically unsaturated co-monomers may include, for example, (meth)acrylamide monomers, amine-functionalized (meth)acrylate monomers, polyether-functionalized (meth)acrylate monomers, and the like. Specific examples of suitable co-monomers may include, for instance, n-butyl (meth)acrylate, isobutyl (meth) acrylate, methyl (meth)acrylate, ethyl (meth)acrylate, 2-ethylhexyl (meth)acrylate, and cycloalkyl (meth)acrylates such as isobornyl (meth)acrylate and cyclohexyl (meth)acrylate, (meth)acrylamide, hydroxy-functionalized (meth)acrylate monomers such as hydroxyethyl (meth)acrylate and hydroxylpropyl (meth)acrylate, and (meth)acrylamide derivatives such as N-methylol (meth)acrylamide and diacetone (meth) acrylamide.

Other suitable ethylenically unsaturated monomers that may be present in the crosslinked fluorinated polymers disclosed herein may include at least one amine group, which may be a primary amine, a secondary amine or a tertiary amine. Particularly suitable examples of ethylenically unsaturated monomers comprising at least one amine group include (meth)acrylate monomers such as, for example, 2-(dimethylamino)ethyl (meth)acrylate, 3-(dimethylamino)propyl (meth)acrylate, 2-(diethylamino)ethyl (meth)acrylate, 3-(diethylamino)propyl (meth)acrylate, 2-(ethylamino)ethyl (meth)acrylate, 3-(ethylamino)propyl (meth)acrylate, 2-(methylamino)ethyl (meth)acrylate, 3-(methylamino)propyl (meth)acrylate, 2-(tert-butylamino) ethyl (meth)acrylate, 3-(tert-butylamino)propyl (meth)acrylate, 2-(dimethylamino)ethyl (meth)acrylamide, 3-(dimethylamino)propyl (meth)acrylamide, 2-(diethylamino)ethyl (meth)acrylamide, 3-(dimethylamino)propyl (meth)acrylamide, 2-(methylamino)ethyl (meth)acrylamide, 3-(methylamino)propyl (meth)acrylamide, 2-(ethylamino)ethyl (meth)acrylamide, 3-(ethylamino)propyl (meth)acrylamide, 2-(tert-butylamino)ethyl (meth)acrylamide, and 3-(tert-butylamino)propyl (meth)acrylamide. Vinyl amine may also represent a suitable co-monomer in some cases.

Alpha olefins are another type of ethylenically unsaturated monomer that may be present as a co-monomer in the polymer nanoparticles disclosed herein. Suitable alpha olefins that the may be present in the polymer nanoparticles of the present disclosure include, but are not limited to, ethylene, propylene, isobutylene, 1-butene, 1-pentene, 1-hexene, 4-methyl-1-pentene, 1-octene, 1-decene, 1-dodecene, 1-tetradecene, or any combination thereof. Linear alpha olefins having an even number of carbon atoms may be particularly suitable due to their ready commercial availability.

Still other examples of ethylenically unsaturated monomers that may be present in the polymer nanoparticles of the present disclosure include, for example, styrene or substituted variants thereof; vinyl esters, such as vinyl acetate, vinyl alkanoates or their derivatives; nitriles such as (meth) acrylonitrile and fumaronitrile; ethylenically unsaturated halides such as vinyl chloride and vinylidene chloride, any of which may be present in combination with one or more of the ethylenically unsaturated monomers listed above.

Still other examples of ethylenically unsaturated monomers that may be present as a co-monomer in the polymer nanoparticles of the present disclosure include, but are not limited to, methyl vinyl ketone, ethyl vinyl ketone, butyl vinyl ketone, acrolein, methacrolein, crotonaldehyde, acetoacetoxyethyl (meth)acrylate (AAEM), glycidyl (meth) acrylate, and any combination thereof.

Ethylenically unsaturated monomers bearing at least one acidic group may also be present as a co-monomer in the polymer nanoparticles of the present disclosure. Such ethylenically unsaturated monomers may bear a side chain carboxylic acid or sulfonic acid. Illustrative examples may include, but are not limited to, maleic acid, methyl hydrogen maleate, ethyl hydrogen maleate, itaconic acid, fumaric acid, crotonic acid, citraconic acid, styrenesulfonic acid, and 2-aminomethylpropanesulfonic acid derivatized with a vinyl group. Carboxylic acid forms of the foregoing monomers may be present in an esterified form as well, such as methyl, ethyl, propyl, isopropyl, butyl, isobutyl, t-butyl or like esterified form. Other suitable esterified monomers may comprise an ethylenically unsaturated group in the alcohol-derived portion of the esterified monomer. Such ethylenically unsaturated monomers may include, for example, vinyl acetate, allyl acetate, vinyl propionate, allyl propionate, vinyl benzoate, allyl benzoate, and the like.

Polymerization to afford a crosslinked fluorinated polymer utilizing any of the foregoing fluorinated (meth)acrylic monomers, ethylenically unsaturated co-monomers, and crosslinkers may be conducted via emulsion polymerization in non-limiting embodiments. Once polymerization has taken place under suitable emulsion polymerization conditions to afford a crosslinked fluorinated polymer, polymer nanoparticles may be obtained in at least partially isolated form by removing solvent from the emulsion (e.g., by spray drying or evaporation) and/or by removing the polymer nanoparticles from the emulsion (e.g., by filtration or centrifugation). Suitable emulsion polymerization conditions will be familiar to one having ordinary skill in the art and are summarized in brief hereinafter.

Suitable emulsion polymerization conditions may feature an aqueous fluid in which emulsion polymerization takes place. Aqueous fluids suitable for use in the present disclosure may comprise water or water admixed with a water-miscible organic solvent, such as an alcohol or a glycol. The aqueous fluids and the resulting polymer emulsions may be acidic, neutral, or basic, depending upon particular application needs. A particular pH may be chosen to maintain or break the emulsion, for example, optionally with buffering, if needed. Suitable pH values during emulsion polymerization may range from about 1 to about 7, or about 2 to about 6, or about 1 to about 6, or about 6 to about 7, or about 6 to about 8, or about 7 to about 8, or about 7 to about 14, or about 8 to about 14, or about 8 to about 12, or about 7 to about 9.

The aqueous fluid may comprise at least one surfactant to promote emulsification, according to some embodiments. Suitable surfactants may be cationic, anionic, zwitterionic, non-ionic, or any combination thereof. Illustrative non-ionic surfactants may include, for example, alkylaryl polyether alcohols, alkylphenol ethoxylates, alkyl ethoxylates, polyoxamers, fatty acid esters (e.g., fatty acid glycerol esters, fatty acid sorbitan esters, fatty acid sorbitol esters, fatty acid lecithin esters, and the like), polyethylene oxide sorbitan fatty acid esters, and any combination thereof. Polymer colloids such as polyvinyl alcohol, polyvinylpyrrolidone, hydroxyethylcellulose and other cellulose derivatives, and the like may also comprise suitable non-ionic surfactants. Illustrative anionic surfactants that may be suitable for use in the disclosure herein include, but are not limited to, alkyl ethoxylate sulfates, alkyl ethoxylate sulfonates, alkylphenol ethoxylate sulfates, alkylphenol ethoxylate sulfonates, alkylsulfates, alkylsulfonates, alkylarylsulfates, alkylarylsulfonates, sulfosuccinates, and any combination thereof. Illustrative zwitterionic surfactants that may be suitable for use in the disclosure herein include various betaines and sultaines. The at least one surfactant may be present in the polymer emulsions of the present disclosure in an amount ranging from about 0.2 wt. % to about 10 wt. %, or about 0.2 wt. % to about 7 wt. % as measured against total solids.

Emulsion polymerization of ethylenically unsaturated monomers may take place in the presence of at least one radical initiator. The at least one radical initiator may be present at about 0.1 to about 8 percent by weight of the monomers undergoing polymerization. Suitable radical initiators may be capable of promoting radical polymerization under thermal conditions or photolytic conditions when in the emulsion. Such radical initiators may include, but are not limited to, sodium persulfate or other alkali metal persulfates, ammonium persulfate, azo compounds (e.g., 4,4'-azobis-cyanovaleric acid and/or AIBN), redox systems comprising sodium hydroxymethane sulfonate (sodium formaldehyde sulfoxylate) and reducing agents such as ascorbic acid, oxidizing initiators such as t-butyl-hydroperoxide, the like, and any combination thereof. Other suitable radical initiators may include azoamidine compounds such as, for example, 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methylpropionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2' azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis{2-[1-(2-hydroxyethyl)-2-imidazolin-2-yl]propane}dihydrochloride, combinations thereof, and the like. Thermal radical polymerization condition may occur at a temperature ranging from about 20° C. to about 90° C.

Once formed by emulsion polymerization, polymer nanoparticles may be recovered by any suitable technique such as filtration, centrifugation, spray drying, any combination thereof, and the like.

Additional nanoparticles may be present in combination with the polymer nanoparticles upon the outer surface of the thermoplastic particulates, particularly inorganic nanoparticles selected from a plurality of oxide nanoparticles, carbon black, or any combination thereof. Oxide nanoparticles suitable for use in the present disclosure may include, for example, silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides formed as nanoparticles, such as aluminosilicates, borosilicates, and aluminoborosilicates, for example, are also encompassed by the term "oxide" and may be suitable for use in the disclosure herein. The oxide nanoparticles may be hydrophilic or hydrophobic in nature, which may be native to the nanoparticles or result from surface treatment of the nanoparticles. For example, silica nanoparticles having a hydrophobic surface treatment, such as dimethylsilyl, trimethylsilyl, or the like, may be formed through reacting hydrophilic surface hydroxyl groups with an appropriate functionalizing agent. Hydrophobically functionalized oxide nanoparticles may be particularly desirable in the methods and compositions of the present disclosure, although unfunctionalized oxide nanoparticles or hydrophilically modified oxide nanoparticles may also be suitable for use as well. For example, hydrophobically functionalized oxide nanoparticles may be particularly compatible with the hydrophobic fluids employed as carrier fluids in melt emulsification processes, as discussed further below.

Silica nanoparticles, particularly fumed silica nanoparticles with a hydrophobic functionalization thereon, may be especially suitable for use in combination with polymer nanoparticles in the disclosure herein, since a wide variety of functionalized silicas are available with different types of hydrophobic functionalizations and at a range of particle sizes. Silazane and silane hydrophobic functionalizations are among the hydrophobic functionalizations that may be present in silica nanoparticles compatible for use in the present disclosure. The combination of polymer nanoparticles and silica nanoparticles may convey specified properties to the thermoplastic particulates, or a consolidated object formed therefrom, that may not be realized when using silica nanoparticles or polymer nanoparticles alone.

Hydrophobic functionalization may make silica nanoparticles less compatible with water than are unfunctionalized silica nanoparticles. Suitable hydrophobic functionalization may be non-covalently or covalently attached to a surface of the silica nanoparticles. Covalent attachment may take place, for example, through functionalization of surface hydroxyl groups on the surface of the silica nanoparticles. In a non-limiting example, silica nanoparticles may be treated with hexamethyldisilazane to afford covalent attachment of a hydrophobic functionalization. Commercially available hydrophobically functionalized silica nanoparticles usable in combination with polymer nanoparticles may include, but are not limited to, Aerosil RX50 (Evonik, average particle size=40 nm) and Aerosil R812S (Evonik, average particle size=7 nm).

Carbon black is another type of nanoparticle that may be present upon thermoplastic particulates in combination with polymer nanoparticles in the disclosure herein. Various grades of carbon black will be familiar to one having ordinary skill in the art, any of which may be suitable for use in the disclosure herein. Various types of oxide nanoparticles may also be present in combination with polymer nanoparticles in the disclosure herein in some instances.

The loading and particle size of nanoparticles of various types upon the thermoplastic particulates of the present disclosure may vary over a wide range. The nanoparticle loading upon the polymer nanoparticles or similar types of nanoparticles may depend upon the nanoparticle concentration(s) in a carrier fluid used to promote thermoplastic particulate formation under melt emulsification conditions, as described further below. In non-limiting examples, the concentration of nanoparticles in the carrier fluid may range from about 0.01 wt. % to about 10 wt. %, or about 0.05 wt. % to about 10 wt. %, or about 0.05 wt. % to about 5 wt. %, or about 0.1 wt. % to about 2 wt. %, or about 0.25 wt. % to about 1.5 wt. %, or about 0.2 wt. % to about 1.0 wt. %, or about 0.25 wt. % to about 1 wt. %, or about 0.25 wt. % to about 0.5 wt. % with respect to the weight of the thermoplastic polymer. The foregoing weight percentages refer to the weight percentage of polymer nanoparticles that may be present or a combined weight percentage of polymer nanoparticles and at least one other type of nanoparticle, such as silica nanoparticles. When polymer nanoparticles are used in combination with another type of nanoparticle, the polymer nanoparticles and the at least one other type of nanoparticle (e.g., silica nanoparticles) may be present in combination with one another in any ratio ranging from about 1:99 to about 99:1 on a weight basis.

The particle size of the nanoparticles, particularly polymer nanoparticles may range from about 1 nm to about 100 nm, although particles sizes up to about 500 nm may also be acceptable. The foregoing may represent $D_{50}$ values. In non-limiting examples, the particle size of the nanoparticles, particularly polymer nanoparticles, may range from about 5 nm to about 500 nm, or about 5 nm to about 100 nm, or about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. When polymer nanoparticles are present in combination with another type of nanoparticle, such as silica nanoparticles, the size of the polymer nanoparticles may be substantially the same as or differ from the size of the other type of nanoparticles, such as silica nanoparticles. When used in combination, the polymer nanoparticles may be larger or smaller than the other type of nanoparticles.

Silica nanoparticles and similar oxide nanoparticles suitable for use in the disclosure herein in combination with polymer nanoparticles, may have a BET surface area of about 10 m$^2$/g to about 500 m$^2$/g, or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g.

Particular examples of oxide nanoparticles suitable for use in the disclosure herein in combination with polymer nanoparticles may include those treated with an alkyl silane, such as hexamethyldisilazane (HMDS), dimethyldichlorosilane, or other long-chain alkyl silanes such as decyltriethoxysilane or octyltriethoxysilane, for example. Suitable oxide nanoparticles may vary from about 7 nm to about 130 nm in size. Specific commercial examples of hydrophobically treated silicas, their particle sizes, and their hydrophobic treatment may include the following: Wacker HDK® H13TD (16 nm, PDMS), HDK® H13TM (16 nm, HMDS), HDK® H13TX (16 nm, HMDS/PDMS), HDK® H20TD (12 nm, PDMS), HDK® H20TM (12 nm, HMDS), HDK® H20TX (12 nm, HMDS/PDMS), HDK® H30TD (8 nm, PDMS), HDK® H30TM (8 nm, HMDS), HDK® H30TX (8 nm, HMDS/PDMS), HDK® H3004 (12 nm, HMDS), HDK® HO5TD (40 nm, PDMS), HDK® HO5TM (40 nm, HMDS), HDK® HO5TX (40 nm, HMDS/PDMS); Evonik R972 (16 nm, DDS), RY200S (16 nm, PDMS, BET surface area=200 m$^2$/g), R202 (16 nm, PDMS), R974 (12 nm, DDS), RY200 (12 nm, PDMS), RX200 (12 nm, HMDS), R8200 (12 nm, HMDS), R805 (12 nm, alkyl silane), R104 (12 nm, alkyl silane), RX300 (7 nm, HMDS), R812 (7 nm, HMDS), R812S (7 nm, HMDS, BET surface area=300 m$^2$/g), R106 (7 nm, alkyl silane), NY50 (30 nm, PDMS), NAX50 (30 nm, HMDS), RY50 (40 nm, PDMS), and RX50 (40 nm, HMDS); Cabot TS530 (8 nm, HMDS); and Shin-Etsu sol-gel silicas X24-9163A (110 nm, HMDS, BET surface area=25 m$^2$/g) and X24-9600A-80 (80 nm, HMDS, BET=40 m$^2$/g).

Suitable oxide nanoparticles may also include treatments including bases or base salts. Specific commercial examples of such treated oxide nanoparticles, their particle sizes, and their treatment include the following types of silica nanoparticles: Wacker treated silicas HDK® H13TA (16 nm, PDMS-NR$_2$/NR$_3^+$), HDK® H30TA (8 nm, PDMS-NR$_2$/NR$_3^+$), HDK® H2015EP (12 nm, PDMS-NR$_2$/NR$_3^+$), HDK® H2050EP (10 nm, PDMS-NR$_2$/NR$_3^+$), HDK® H2150VP (10 nm, PDMS-NR$_2$/NR$_3^+$), and HDK® H3050VP (8 nm, PDMS-NR$_2$/NR$_3^+$).

Other suitable oxide nanoparticles, including both treated and untreated variants thereof, may include titanates. Suitable titanates may include, for example, $CaTiO_3$, $BaTiO_3$, $MgTiO_3$, $MnTiO_3$, $SrTiO_3$ and. $Al_2TiO_5$.

Also suitable for use in the disclosure herein in combination with polymer nanoparticles are treated or untreated aluminum oxides. Specific commercial examples of aluminum oxides, their particle sizes, and their treatment include, for instance, Evonik C805 (13 nm, octylsilane), Aluminum Oxide C (13 nm, untreated), Aeroxide Alu C 100 (10 nm, untreated), Aeroxide Alu C 130 (13 nm, untreated); Cabot SpectrAL 81 (21 nm, untreated), and Cabot SpectrAl 100 (18 nm, untreated).

Still other suitable oxide nanoparticles suitable for use in combination with polymer nanoparticles may include treated or untreated titanium dioxides. Examples of suitable commercial titanium dioxides may include JMT-1501B from Tayca Corp., having a volume average particle diameter of 15 nm, JMT2000 from Tayca Corp., having particle dimensions of 15×15×40 nm, T805 from Evonik having a volume average particle diameter of about 21 nm, SMT5103 from Tayca Corporation having a particle size of about 40 nm, and STT-100H from Inabata America Corporation of average size of about 40 nm.

Based on turbidity measurements, about 80-90% of the available nanoparticles, such as polymer nanoparticles or silica nanoparticles, may become associated with thermoplastic particulates formed through melt emulsification according to the disclosure herein. Since the loading of nanoparticles is measured relative to the thermoplastic polymer, the amount of nanoparticles associated with the thermoplastic particulates may be about 80-90% of the nanoparticle loading used when forming the theremoplastic particulates. Higher or lower amounts of nanoparticles may become associated with the thermoplastic particulates when higher or lower nanoparticle loadings are employed in the carrier fluid.

The thermoplastic particulates of the present disclosure may have the nanoparticles, particularly polymer nanoparticles, at least partially embedded in the outer surface of the thermoplastic particulates. When embedment occurs, a portion of the nanoparticle structure may be located in a crater or depression in the outer surface, thereby making it more difficult to dislodge the nanoparticles from the surface. It is to be appreciated that even when substantial embedment does not occur, appropriately functionalized nanoparticles, such as hydrophobically functionalized silica nanoparticles or polymer nanoparticles, may non-covalently associate (e.g., in a van der Waals-type interaction) to promote retention of the nanoparticles upon the outer surface.

Examples of thermoplastic polymers suitable for use in the disclosure herein include, but are not limited to, polyamides (e.g., Nylon-6, Nylon-12, and the like), polyurethanes, polyethylenes, polypropylenes, polyacetals, polycarbonates, polyethylene or polybutylene terephthalates, glycol-modified polyethyelene terephthalates or polybutylene terephthalates, polystyrenes, polyvinyl chlorides, polytetrafluoroethenes, polylactic acid and other polyesters, polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyaryl ether ketones (PAEK), polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymers, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, the like, and any combination thereof. Copolymers comprising one or more of the foregoing may also be used in the present disclosure. Any of the foregoing polymers may be thermoplastic elastomers and comprise a crystalline "hard" segment and an amorphous "soft" segment.

Particularly suitable examples of thermoplastic polymers for use in the disclosure herein may include polyamides, such as Nylon-6 or Nylon-12; acrylonitrile butadiene styrene; polylactic acid; polyurethanes; poly(arylene ether)s; polyaryletherketones; polycarbonates; polyimides; polyphenylene sulfides; poly(arylene sulfone)s; polyesters, such as polyethylene terephthalate or polybutylene terephthalate or glycol-modified variants thereof; and any combination thereof.

More specific examples of suitable polyamides may include, but are not limited to, polycaproamide (Nylon 6, polyamide 6, or PA6), poly(hexamethylene succinamide) (Nylon 46, polyamide 46, or PA46), polyhexamethylene adipamide (Nylon 66, polyamide 66, or PA66), polypentamethylene adipamide (Nylon 56, polyamide 56, or PA56), polyhexamethylene sebacamide (Nylon 610, polyamide 610, or PA610), polyundecaamide (Nylon 11, polyamide 11, or PA11), polydodecaamide (Nylon 12, polyamide 12, or PA12), and polyhexamethylene terephthalamide (Nylon 6T, polyamide 6T, or PA6T), Nylon 10.10 (polyamide 10.10 or PA10.10), Nylon 10.12 (polyamide 10.12 or PA10.12), Nylon 10.14 (polyamide 10.14 or PA10.14), Nylon 10.18 (polyamide 10.18 or PA10.18), Nylon 6.10 (polyamide 6.10 or PA6.10), Nylon 6.18 (polyamide 6.18 or PA6.18), Nylon 6.12 (polyamide 6.12 or PA6.12), Nylon 6.14 (polyamide 6.14 or PA6.14), semi-aromatic polyamide, the like, and any combination thereof. Copolyamides may also be used. Examples of suitable copolyamides may include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Polyesteramides, polyetheresteramides, polycarbonate-esteramides, and polyether-block-amides, any which may be elastomeric, may also be used in the disclosure herein.

Examples of suitable polyurethanes include, but are not limited to, polyether polyurethanes, polyester polyurethanes, mixed polyether and polyester polyurethanes, the like, and any combination thereof. Suitable polyurethanes may include elastomeric polyurethanes, which are prepared by condensation of an isocyanate, a polyol, and a chain extender, where the polyols impart flexibility to the polymer chain and typically constitute a soft segment. Examples of suitable polyurethanes for use in the present disclosure include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), the like, and any combination thereof.

Suitable polyesters are a condensation reaction product formed from a diacid and a diol, or a self-condensation reaction product of a hydroxyacid, such as lactic acid. Glycol-modified polyesters, such as glycol-modified polyethylene terephthalate or glycol-modified polybutylene terephthalate may be particularly suitable for use in the disclosure herein. Glycol modification may impart desirable benefits such as optical transparency and flexibility of the polymer chain.

Suitable thermoplastic polymers may be elastomeric or non-elastomeric. Some of the foregoing examples of thermoplastic polymers may be elastomeric or non-elastomeric depending on the specific composition of the polymer. For example, polyethylene that is a copolymer of ethylene and propylene may be elastomeric or not depending on the amount of propylene present in the polymer.

Elastomeric thermoplastic polymers suitable for use in the disclosure herein generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Particular examples of elastomeric thermoplastic polymers can be found in Handbook of Thermoplastic Elastomers, 2nd ed., B. M. Walker and C. P. Rader, eds., Van Nostrand Reinhold, New York, 1988. Examples of suitable elastomeric thermoplastic polymers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

FIG. 1 is a flow chart of non-limiting example method 100 for producing thermoplastic particulates in accordance with the present disclosure. As shown, thermoplastic polymer 105, carrier fluid 104, and polymer nanoparticles 106 are combined 108 to produce mixture 110. Optionally, other nanoparticles, such as silica nanoparticles, may be present in combination with polymer nanoparticles 106. Thermoplastic polymer 105, carrier fluid 104, and nanoparticles 106 may be combined 108 in any order, with mixing and/or heating being conducted. In a particular example, carrier fluid 104 may be heated above a melting point or softening temperature of thermoplastic polymer 105 before combining the other components therewith. Alternately, all the components may be mixed together in carrier fluid 104 and then heated above the melting point or softening temperature. Polymer nanoparticles 106 may remain as a solid at the heating temperature so that they can become disposed upon the outer surface of the resulting thermoplastic particulates following melt emulsification.

Heating above the melting point or softening temperature of thermoplastic polymer 105 may be at any temperature below the decomposition temperature or boiling point of any of the components in the melt emulsion. In non-limiting examples, heating at a temperature about 1° C. to about 50°

C., or about 1° C. to about 25° C., or about 5° C. to about 30° C., or about 20° C. to about 50° C. above the melting point or softening temperature of thermoplastic polymer 105 may be conducted. In the disclosure herein, melting points may be determined by ASTM E794-06(2018) with 10° C./min ramping and cooling rates. The softening temperature or softening point of a thermoplastic polymer, unless otherwise specified, may be determined by ASTM D6090-17. The softening temperature can be measured by using a cup and ball apparatus available from Mettler-Toledo using a 0.50 gram sample with a heating rate of 1° C./min. Melting points or softening temperatures of thermoplastic polymer 105 in the present disclosure may range from about 50° C. to about 400° C. In more particular examples, the heating temperature may range from about 100° C. to about 300° C. or about 200° C. to about 250° C., provided that thermoplastic polymer 105 melts or softens within this range.

Mixture 110 is then processed 112 by applying sufficient shear to produce liquefied droplets of thermoplastic polymer 105 at a temperature greater than the melting point or softening temperature of thermoplastic polymer 105, thereby forming melt emulsion 114. Without being limited by theory, it is believed that, all other factors being the same, increasing shear may decrease the size of the liquefied droplets in carrier fluid 104. It is to be understood that at some point there may be diminishing returns on increasing shear and decreasing the droplet size in turn and/or disruptions to the droplet contents at higher shear rates. Examples of mixing apparatuses suitable for producing melt emulsion 114 include, but are not limited to, extruders (e.g., continuous extruders, batch extruders and the like), stirred reactors, blenders, reactors with inline homogenizer systems, and the like, and apparatuses derived therefrom.

In non-limiting examples, the liquefied droplets may have a size of about 1 µm to about 1,000 µm, or about 1 µm to about 500 µm, or about 25 µm to about 500 µm, or about 1 µm to about 200 µm, or about 1 µm to about 150 µm, or about 1 µm to about 130 µm, or about 1 µm to about 100 µm, or about 10 µm to about 150 µm, or about 10 µm to about 100 µm, or about 20 µm to about 80 µm, or about 20 µm to about 50 µm, or about 50 µm to about 90 µm. The resulting thermoplastic particulates formed after solidification may reside within similar size ranges. That is, the thermoplastic particulates in the particulate compositions and methods of the present disclosure may have a size of about 1 µm to about 1,000 µm, or about 1 µm to about 500 µm, or about 25 µm to about 500 µm, or about 1 µm to about 200 µm, or about 1 µm to about 150 µm, or about 1 µm to about 130 µm, or about 1 µm to about 100 µm, or about 1 µm to about 200 µm, or about 10 µm to about 100 µm, or about 20 µm to about 80 µm, or about 20 µm to about 50 µm, or about 50 µm to about 90 µm. Particle size measurements may be made by analysis of optical images or using onboard software of a Malvern Mastersizer 3000 Aero S instrument, which uses light scattering techniques for particle size measurement.

For light scattering techniques, glass bead control samples with a diameter within the range of 15 µm to 150 µm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S. Particle sizes may be derived using the instrument software from a plot of volume density as a function of size.

Melt emulsion 114 is then cooled 116 to solidify the liquefied droplets into thermoplastic particulates in a solidified state. The cooling rate may range from about 100° C./sec to about 10° C./hour or about 10° C./sec to about 10° C./hr, including any cooling rate in between. Shear may be discontinued during cooling, or may be maintained at the same rate or a different rate during cooling. Cooled mixture 118 can then be treated 120 to isolate thermoplastic particulates 122 from other components 124 (e.g., carrier fluid 104, excess polymer nanoparticles 106, and the like). Washing, filtering and/or the like may be conducted at this stage to purify thermoplastic particulates 122 further, wherein thermoplastic particulates 122 comprise thermoplastic polymer 105, and at least a portion of polymer nanoparticles 106 coating the outer surface of thermoplastic particulates 122. Depending upon non-limiting factors such as the temperature (including cooling rate), the type of thermoplastic polymer 105, and the types and sizes of polymer nanoparticles 106, polymer nanoparticles 106 may become at least partially embedded within the outer surface of thermoplastic particulates 122 in the course of becoming disposed thereon. Even without embedment taking place, polymer nanoparticles 106 may remain robustly associated with thermoplastic particulates 122 to facilitate their further use.

In the foregoing, thermoplastic polymer 105 and carrier fluid 104 are chosen such that these components are immiscible or substantially immiscible (<1 wt. % solubility) at the various processing temperatures (e.g., from room temperature to the temperature at which liquefied droplets are formed and maintained as two or more phases).

After separating thermoplastic particulates 122 from other components 124, further processing 126 of thermoplastic particulates 122 may take place. In a non-limiting example further processing 126 may include, for example, sieving thermoplastic particulates 122 and/or blending thermoplastic particulates 122 with other substances to form processed thermoplastic particulates 128. Processed thermoplastic particulates 128 may be formulated for use in a desired application, such as additive manufacturing in a non-limiting example.

The thermoplastic particulates may have a bulk density of about 0.3 g/cm$^3$ to about 0.8 g/cm$^3$, or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$.

Shear sufficient to form liquefied droplets may be applied through stirring the carrier fluid in particular examples of the present disclosure. In non-limiting examples, the stirring rate may range from about 50 rotations per minute (RPM) to about 1500 RPM, or about 250 RPM to about 1000 RPM, or about 225 RPM to about 500 RPM, or about 1000 RPM to about 2000 RPM. The stirring rate while melting the thermoplastic polymer may be the same as or different than the stirring rate used once liquefied droplets have formed. The liquefied droplets may be stirred over a stirring time of about 30 seconds to about 18 hours or longer, or about 1 minute to about 180 minutes, or about 1 minute to about 60 minutes, or about 5 minutes to about 6 minutes, or about 5 minutes to about 30 minutes, or about 10 minutes to about 30 minutes, or about 30 minutes to about 60 minutes.

Loading (concentration) of the thermoplastic polymer in the carrier fluid may vary over a wide range. In non-limiting examples, the loading of the thermoplastic polymer in the carrier fluid may range from about 1 wt. % to about 99 wt. % relative to the weight of the carrier fluid. In more particular examples, the loading of the thermoplastic polymer may range from about 5 wt. % to about 75 wt. %, or about 10 wt. % to about 60 wt. %, or about 20 wt. % to about 50 wt. %, or about 20 wt. % to about 30 wt. %, or about 30 wt. % to about 40 wt. %, or about 40 wt. % to about 50 wt.

%, or about 50 wt. % to about 60 wt. % relative to the weight of the carrier fluid. The thermoplastic polymer may be present in an amount ranging from about 5 wt. % to about 60 wt. %, or about 5 wt. % to about 25 wt. %, or about 10 wt. % to about 30 wt. %, or about 20 wt. % to about 45 wt. %, or about 25 wt. % to about 50 wt. %, or about 40 wt. % to about 60 wt. % relative to a combined amount of the thermoplastic polymer and the carrier fluid.

Upon forming thermoplastic particulates in the presence of nanoparticles according to the disclosure herein, at least a portion of the polymer nanoparticles and/or other types of nanoparticles may be disposed as a coating or partial coating upon the outer surface of the thermoplastic particulates. The coating may be disposed substantially uniformly upon the outer surface in some cases. As used herein with respect to a coating, the term "substantially uniform" refers to an even coating thickness in surface locations covered by the nanoparticles, particularly the entirety of the outer surface. Coating coverage upon the thermoplastic particulates may range from about 5% to about 100%, or about 5% to about 25%, or about 20% to about 50%, or about 40% to about 70%, or about 50% to about 80%, or about 60% to about 90%, or about 70% to about 100% of the surface area of the particulates. Coverage may be determined by image analysis of SEM micrographs.

Carrier fluids suitable for use in the disclosure herein include those in which the thermoplastic polymer and polymer nanoparticles are substantially immiscible with the carrier fluid, the carrier fluid has a boiling point exceeding the melting point or softening temperature of the thermoplastic polymer, and the carrier fluid has sufficient viscosity to form liquefied droplets of substantially spherical shape once the thermoplastic polymer has undergone melting or softening therein. Suitable carrier fluids may include, for example, silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, the like, and any combination thereof.

Suitable carrier fluids may have a density of about 0.6 g/cm$^3$ to about 1.5 g/cm$^3$, and the thermoplastic polymer may have a density of about 0.7 g/cm$^3$ to about 1.7 g/cm$^3$, wherein the thermoplastic polymer has a density similar to, lower than, or higher than the density of the carrier fluid. Blends of carrier fluids having differing viscosities and/or density may be utilized to achieve an intermediate property between that of the blend components.

Particularly suitable silicone oils include polysiloxanes. Illustrative silicone oils suitable for use in the disclosure herein include, for example, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like and any combination thereof.

In non-limiting examples, the carrier fluid and the thermoplastic polymer may be heated at a temperature of about 200° C. or above. Suitable heating temperatures may be chosen based upon the melting point or softening temperature of the thermoplastic polymer, the boiling point of the carrier fluid, and a decomposition temperature of the polymer nanoparticles. The cooling rate following formation of liquefied polymer droplets may be varied as desired. In some instances, cooling may take place with heat dissipation to the surrounding environment taking place at an innate (uncontrolled) rate once heating is discontinued. In other cases, cooling at a controlled rate (e.g., by gradually decreasing the heating temperature and/or using jacketed temperature control to increase or decrease the rate of cooling may be employed.

Suitable carrier fluids, such as polysiloxanes, including PDMS, may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. The viscosity of the carrier fluid may be obtained from commercial suppliers or it may be measured, if desired, through techniques known to persons having ordinary skill in the art.

Separating the thermoplastic particulates from the carrier fluid may take place by any of a variety of known separation techniques. Any of gravity settling and filtration, decantation, centrifugation, or the like may be used to separate the thermoplastic particulates from the carrier fluid. The thermoplastic particulates may then be washed with a solvent in which the carrier fluid is soluble and the thermoplastic particulates are insoluble in the course of the separation process. In addition, a solvent in which the carrier fluid is soluble and the thermoplastic particulates are insoluble may be mixed with the carrier fluid and the thermoplastic particulates before initially separating the thermoplastic particulates from the carrier fluid.

Suitable solvents for washing the thermoplastic particulates or mixing with the carrier fluid may include, but are not limited to, aromatic hydrocarbons (e.g., toluene and/or xylene), aliphatic hydrocarbons (e.g., heptane, n-hexane, and/or n-octane), cyclic hydrocarbons (e.g., cyclopentane, cyclohexane, and/or cyclooctane), ethers (e.g. diethyl ether, tetrahydrofuran, diisopropyl ether, and/or dioxane), halogenated hydrocarbons (e.g., dichloroethane, trichloroethane, dichloromethane, chloroform and/or carbon tetrachloride), alcohols (e.g., methanol, ethanol, isopropanol, and/or n-propanol), ketones (e.g., methyl ethyl ketone and/or acetone); esters (e.g., ethyl acetate and the like), water, the like, and any combination thereof. After washing the thermoplastic particulates, any of heating, vacuum drying, air drying, or any combination thereof may be performed.

At least a majority of the thermoplastic particulates obtained according to the disclosure here may be substantially spherical in shape. More typically, about 90% or greater, or about 95% or greater, or about 99% or greater of the thermoplastic particulates produced by melt emulsification according to the present disclosure may be substantially spherical in shape. In other non-limiting examples, the thermoplastic particulates of the present disclosure may have a sphericity (circularity) of about 0.9 or greater, including about 0.90 to about 1.0, or about 0.93 to about 0.99, or about 0.95 to about 0.99, or about 0.97 to about 0.99, or about 0.98 to about 1.0. Sphericity (circularity) may be measured using a Sysmex FPIA-2100 Flow Particle Image Analyzer. To determine circularity, optical microscopy images are taken of the particulates. The perimeter (P) and area (A) of the particulates in the plane of the microscopy image is calculated (e.g., using a SYSMEX FPIA 3000 particle shape and particle size analyzer, available from Malvern Instruments). The circularity of the particulate is CEA/P, where CEA is the circumference of a circle having the area equivalent to the area (A) of the actual particulate.

The thermoplastic particulates of the present disclosure may have an angle of repose of about 25° to about 45°, or about 25° to about 35°, or about 30° to about 40°, or about 35° to about 45°. Angle of repose may be determined using a Hosokawa Micron Powder Characteristics Tester PT-R using ASTM D6393-14 "Standard Test Method for Bulk Solids Characterization by Carr Indices."

Thermoplastic particulates isolated from the carrier fluid according to the disclosure above may be further processed to make the thermoplastic particulates suitable for an intended application. In one example, the thermoplastic particulates may be passed through a sieve or similar structure having an effective screening size that is greater than the average particle size of the thermoplastic particulates. For example, an illustrative screening size for processing thermoplastic particulates suitable for use in three-dimensional printing may have an effective screening size of about 150 μm. When referring to sieving, pore/screen sizes are described per U.S.A. Standard Sieve (ASTM E11-17). Other screening sizes, either larger or smaller, may be more suitable for thermoplastic particulates destined for use in other applications. Sieving may remove larger particulates that may have formed during the melt emulsification process and/or remove agglomerated particulates that may have poor flow characteristics. In general, sieves having an effective screening size ranging from about 10 μm to about 250 μm may be used.

In addition, the thermoplastic particulates, including sieved thermoplastic particulates, may be mixed with one or more additional components such as flow aids, fillers or other substances intended to tailor the properties of the thermoplastic particulates for an intended application. Mixing of the additional components with the thermoplastic particulates may be conducted by dry blending techniques. Suitable examples of flow aids (e.g., carbon black, graphite, silica, and the like) and similar substances will be familiar to one having ordinary skill in the art. Such flow aids differ from the nanoparticles included in melt emulsification, since the flow aids are not robustly adhered to the surface of the thermoplastic particulates when dry blending is performed.

In particular applications, the particulate compositions disclosed herein may be utilized in additive manufacturing processes, especially those employing selective laser sintering or other powder bed fusion processes to promote particulate consolidation. Additive manufacturing methods of the present disclosure may comprise providing a particulate composition of the present disclosure (a particulate composition comprising a plurality of thermoplastic particulates comprising a thermoplastic polymer, and polymer nanoparticles disposed on an outer surface of the thermoplastic particulates), depositing the particulate composition layer-by-layer in a powder bed, and heating a portion of the powder bed to consolidate a portion of the thermoplastic particulates into a consolidated part having a specified shape. The nanoparticles may remain associated with the consolidated part once powder bed fusion has taken place. Specifically, the consolidated part may comprise a thermoplastic matrix formed by consolidation of thermoplastic particulates, and at least polymer nanoparticles admixed with the thermoplastic matrix.

In particular process configurations, consolidation of the thermoplastic particulates may take place using selective laser sintering. Suitable conditions for performing selective laser sintering or other powder bed particulate consolidation processes to form a consolidated part are not believed to be especially limited. Lasers suitable for performing selective laser sintering may include both continuous wave lasers and pulsed wave lasers to provide the energy needed to promote consolidation of the thermoplastic particulates into a consolidated part. $CO_2$ lasers are commonly used to promote consolidation of thermoplastic particulates during additive manufacturing due to the high absorptivity of the polymers to the $CO_2$ laser emission wavelength. The operating conditions of the $CO_2$ laser or similar laser chosen to promote particulate consolidation may be chosen such that particulate consolidation occurs to a desired degree. Standard laser settings for promoting particulate consolidation (e.g., power, scanning rate, bed temperature, and the like) may be selected based on the knowledge of one having ordinary skill in the art. The choice of particular conditions for conducting selective laser sintering or similar particulate consolidation techniques may be influenced by non-limiting factors such as, for example, the type of thermoplastic polymer being used, the size and composition of the thermoplastic particulates, the type of printed object being produced, and the intended use conditions for the printed object. Choice of the sintering conditions may, in non-limiting examples, impact the porosity obtained following particulate consolidation. Preferably, the thermoplastic matrix resulting from particulate consolidation may have a porosity of about 10% or below, or about 5% or below, or about 2% or below, or about 1% or below.

Examples of printed objects formable using the particulate compositions disclosed herein are not considered to be particularly limited and may include, for example, containers (e.g., for food, beverages, cosmetics, personal care compositions, medicine, and the like), shoe soles, toys, furniture parts, decorative home goods, plastic gears, screws, nuts, bolts, cable ties, medical items, prosthetics, orthopedic implants, production of artifacts that aid learning in education, 3D anatomy models to aid in surgeries, robotics, biomedical devices (orthotics), home appliances, dentistry, automotive and airplane/aerospace parts, electronics, sporting goods, and the like.

Embodiments disclosed herein include:

A. Compositions comprising powder particulates. The particulate compositions comprise: a plurality of thermoplastic particulates comprising a thermoplastic polymer, and a plurality of polymer nanoparticles disposed upon an outer surface of the thermoplastic particulates, the polymer nanoparticles comprising a crosslinked fluorinated polymer.

B. Methods for forming a printed object by particulate consolidation. The methods comprise: providing the particulate composition of A; depositing the particulate composition layer-by-layer in a powder bed; and heating a portion of the powder bed to consolidate a portion of the thermoplastic particulates into a consolidated part having a specified shape.

C. Consolidated parts prepared by the method of B. The consolidated parts comprise a thermoplastic matrix formed by consolidation of thermoplastic particulates; and polymer nanoparticles admixed with the thermoplastic matrix.

D. Methods for forming powder particulates. The methods comprise: combining a thermoplastic polymer and polymer nanoparticles with a carrier fluid at a heating temperature at or above a melting point or softening temperature of the thermoplastic polymer and below a melting point, softening temperature or decomposition temperature of the polymer nanoparticles; wherein the thermoplastic polymer and the polymer nanoparticles are substantially immiscible in the carrier fluid at the heating temperature, and the polymer nanoparticles comprise a crosslinked fluorinated polymer; applying sufficient shear to disperse the thermoplastic polymer as liquefied droplets in the carrier fluid at the heating temperature in the presence of the polymer nanoparticles; after liquefied droplets have formed, cooling the carrier fluid to at least a temperature at which thermoplastic particulates in a solidified state form, the thermoplastic particulates comprising the thermoplastic polymer and at least a portion of the polymer nanoparticles disposed upon an outer surface of the thermoplastic particulates; and separating the thermoplastic particulates from the carrier fluid.

Each of embodiments A, B, C and D may have one or more of the following additional elements in any combination:

Element 1: wherein the crosslinked fluorinated polymer comprises a fluorinated (meth)acrylic monomer and a divinyl crosslinker Element 2: wherein the fluorinated (meth)acrylic monomer comprises 2,2,2-trifluoroethyl (meth)acrylate and the divinyl crosslinker comprises a divinylbenzene.

Element 3: wherein the crosslinked fluorinated polymer further comprises an ethylenically unsaturated co-monomer differing from the fluorinated (meth)acrylic monomer.

Element 4: wherein the particulate composition further comprises inorganic nanoparticles disposed upon the outer surface of the thermoplastic particulates, the inorganic nanoparticles comprising a plurality of oxide nanoparticles, carbon black, or any combination thereof.

Element 5: wherein the oxide nanoparticles comprise silica nanoparticles.

Element 6: wherein the thermoplastic particulates comprise about 0.01 wt. % to about 10 wt. % polymer nanoparticles, as measured relative to the thermoplastic polymer.

Element 7: wherein the thermoplastic particulates are substantially spherical and have a $D_{50}$ ranging from about 1 μm to about 1,000 μm.

Element 8: wherein the polymer nanoparticles range from about 5 nm to about 500 nm in size.

Element 9: wherein heating takes place by selective laser sintering.

Element 10: wherein the polymer nanoparticles remain associated with the consolidated part.

Element 11: wherein the polymer nanoparticles are obtained via emulsion polymerization.

Element 12: wherein the method further comprises combining inorganic nanoparticles with the carrier fluid, the inorganic nanoparticles comprising a plurality of oxide nanoparticles, carbon black, or any combination thereof; wherein at least a portion of the inorganic nanoparticles are disposed upon the outer surface of the thermoplastic particulates. Element 13: wherein the carrier fluid comprises a silicone oil.

By way of non-limiting example, exemplary combinations applicable to A, B, C and D include, but are not limited to: 1 and 3; 1-3; 1 and 4; 1, 4 and 5; 1 and 6; 1 and 7; 1 and 8; 4 and 5; 4 and 6; 4 and 7; 4 and 8; 6 and 7; 6 and 8; and 7 and 8.

To facilitate a better understanding of the present disclosure, the following examples of preferred or representative embodiments are given. In no way should the following examples be read to limit, or to define, the scope of the invention.

Examples

In the examples below, powder flow of thermoplastic particulates was characterized through sieving and angle of repose measurements. Sieving was conducted using a 150 μm U.S.A. Standard Sieve (ASTM E11) without particular conditions or duration of force. Angle of repose measurements were performed using a Hosokawa Micron Powder Characteristics Tester PT-R using ASTM D6393-14 "Standard Test Method for Bulk Solids Characterization by Carr Indices."

Average particle size measurements and particle size distributions for the thermoplastic particulates were determined by light scattering using a Malvern Mastersizer 3000 Aero S particle size analyzer. For such light scattering techniques, glass bead control samples having a diameter within the range of 15 μm to 150 μm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S instrument. Particle sizes may be derived using the instrument software from a plot of volume density as a function of size.

Average particle size measurements of polymer nanoparticles were determined by dynamic light scattering using a Nanotrac 252 instrument (MicroTrac, Inc.). This instrument uses a laser light-scattering technique, Doppler-shifted light generated from each particle in motion (Brownian motion) is measured. The signals generated by these shifts are proportional to the size of the particles. The signals are mathematically converted to particle size and size distribution by the instrument software. The analysis can be performed using an external probe or by inserting the probe into a fixed sample chamber. For such light scattering techniques, NIST polystyrene Nanosphere control samples with a diameter within the range of 15 nm to 150 nm under the tradename NIST Traceable Reference Material for Nanotrac Particle Size Analyzers obtained from Microtrac may be used.

In the examples below, weight percentages are measured relative to the thermoplastic polymer unless otherwise specified.

Formation of Polymer Nanoparticles via Emulsion Polymerization. In a 2 L Buchi reactor, 6.5 g of CALFOAM® SLS-30 surfactant (sodium lauryl sulfate at 30% solids, Pilot Chemical) was added to 816 g of deionized water. The reactor was deoxygenated by passing a stream of nitrogen through the reaction mixture and then ramped to 77° C. In a separate 1 L glass vessel, a monomer emulsion was prepared by mixing together 223.6 g of trifluoroethyl methacrylate (TFEMA), 95.8 g of divinylbenzene (DVB), 6.5 g CALFOAM® SLS-30 surfactant (at 30% solids) and 416 g deionized water. A 37.1 g seed amount was taken from the monomer emulsion and pumped into the 2 L reactor at 77° C. An initiator solution prepared from 1.22 g of ammonium persulfate in 34.3 g of deionized water was then added over 20 minutes to the reactor containing the seed emulsion. The remaining monomer emulsion was then fed into the reactor over 120 minutes. The stirring rate was increased after half of the monomer emulsion had been added. After all of the monomer emulsion had been added, the reaction mixture was maintained for 1 hour at 77° C., followed by a 2 hour ramp to 87° C. and a 1 hour hold at this temperature to reduce residual monomer following emulsion polymerization. The resultant latex emulsion contained 20% percent solids with an average particle size of 95 nm (spread: 8 nm to 6.54 μm) and melting point by TGA of 290.6° C. The latex was spray-dried to isolate the fluorinated polymer nanoparticles for subsequent melt emulsification.

Figure 2:
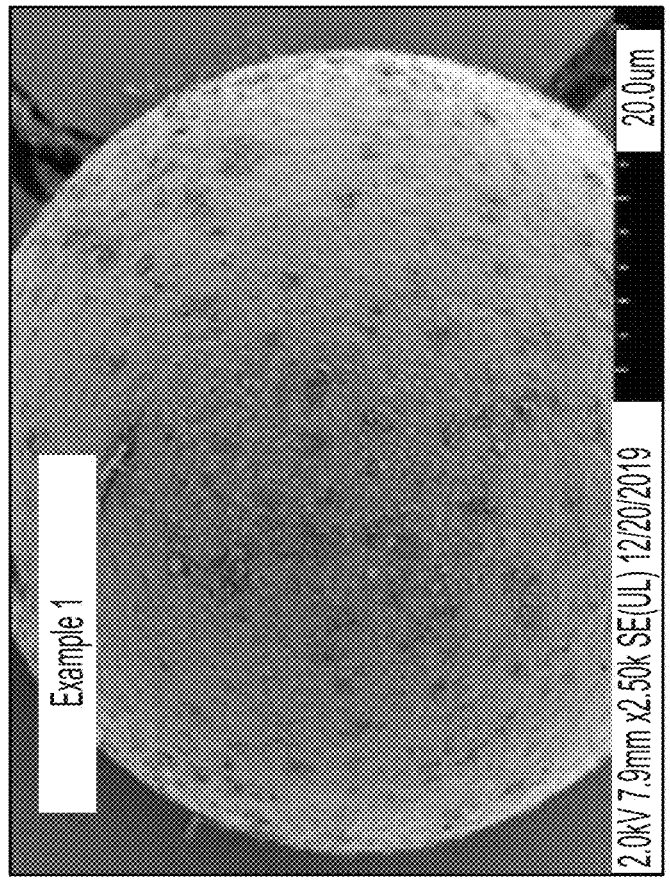
FIG. 2 is a scanning electron microscope image of the polyurethane particulates prepared in accordance with Example 1.
Figure 3:
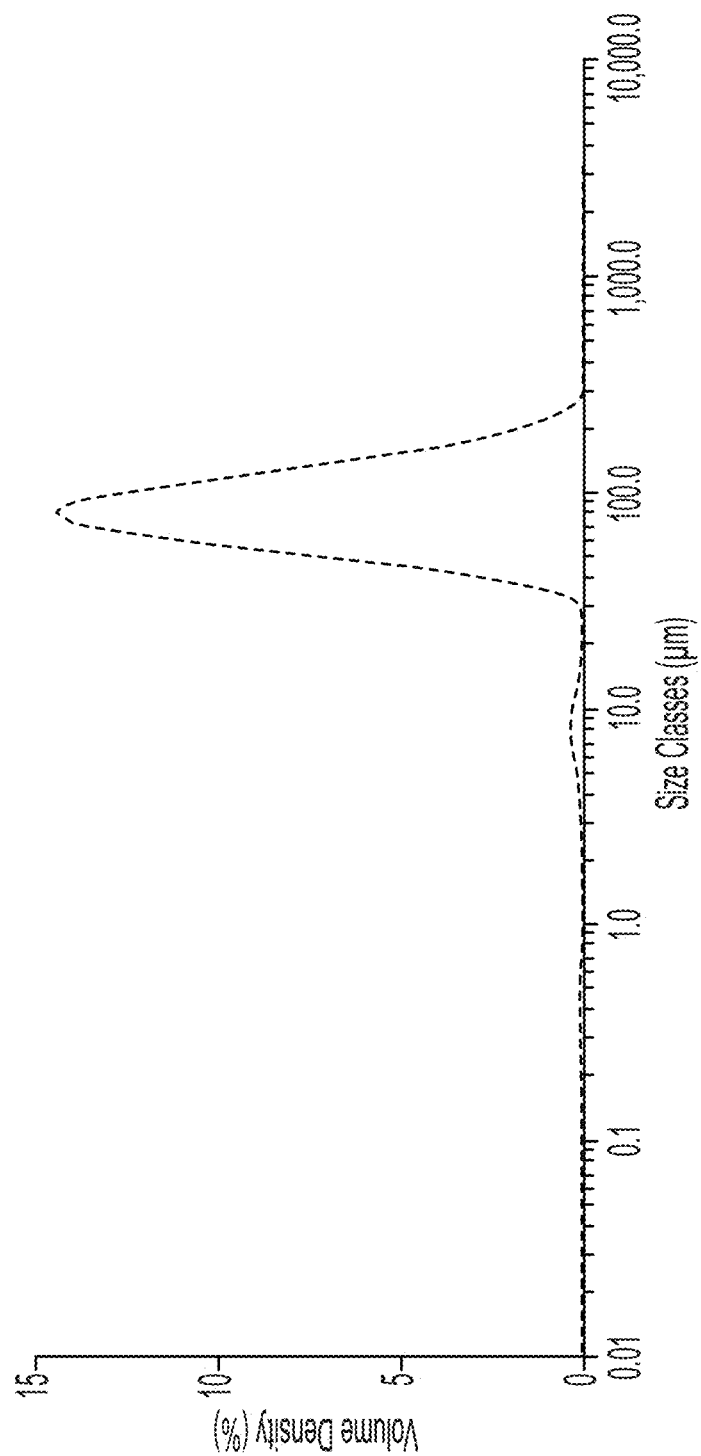
FIG. 3 is a graph showing the particle size distribution of the polyurethane particulates prepared in accordance with Example 1.

Example 1: Polyurethane Particulates Coated with 1.0 Wt. % Fluorinated Polymer Nanoparticles. A 2 L Buchi reactor was loaded with PDMS oil having a viscosity of 30,000 cSt and pre-mixed with 1.0 wt. % of the fluorinated polymer nanoparticles prepared as above. Polyurethane pellets (ELASTOLAN 1190A10, BASF) were then added at 40 wt. % relative to the PDMS oil. The reactor was stirred at 200 rpm under $N_2$ purge for 10 minutes and then heated to 240° C. at a rate of 3.6° C./min. The stirring rate was increased to 500 rpm when the temperature reached around 225° C. The melt dispersion was mixed at 500 rpm for an additional 30 minutes with the $N_2$ shut off after the temperature reached 235° C. After particulate formation had occurred, the hot slurry was discharged to a tray and cooled to room temperature. The resultant polyurethane particulates were re-slurred 4 times in heptane and filtered onto Whatman #1 90 mm filter paper to remove the PDMS oil. The polyurethane particulates had a $D_{50}$ of 81.8 microns (span=1.13) after drying to remove solvent. The angle of repose was 29.8°. FIG. 2 is a scanning electron microscope image of the polyurethane particulates prepared in accordance with Example 1. FIG. 3 is a graph showing the particle size distribution of the polyurethane particulates prepared in accordance with Example 1.

For SLS printing, the particulates were further screened through a 250 μm sieve. The particulates were then printed using a Snow White printer at 108° C. and 70% laser power.

Example 2: Polyurethane Particulates Coated with 1.5 Wt. % Fluorinated Polymer Nanoparticles. Example 1 was repeated except, 1.5 wt. % of fluorinated polymer nanoparticles were used during melt emulsification. The resultant polyurethane particulates had a $D_{50}$ of 42.7 microns (span=0.89) after drying to remove solvent and screening through a 150 μm sieve. The angle of repose was 31.0°.

Example 3: Polyurethane Particulates Coated with 0.75 Wt. % Fluorinated Polymer Nanoparticles. Example 1 was repeated except, 0.75 wt. % of fluorinated polymer nanoparticles were used during melt emulsification. The resultant polyurethane particulates had a $D_{50}$ of about 81.5 microns (span=0.79) after drying to remove solvent and screening through a 150 μm sieve. The angle of repose was 28.3°.

Figure 4:
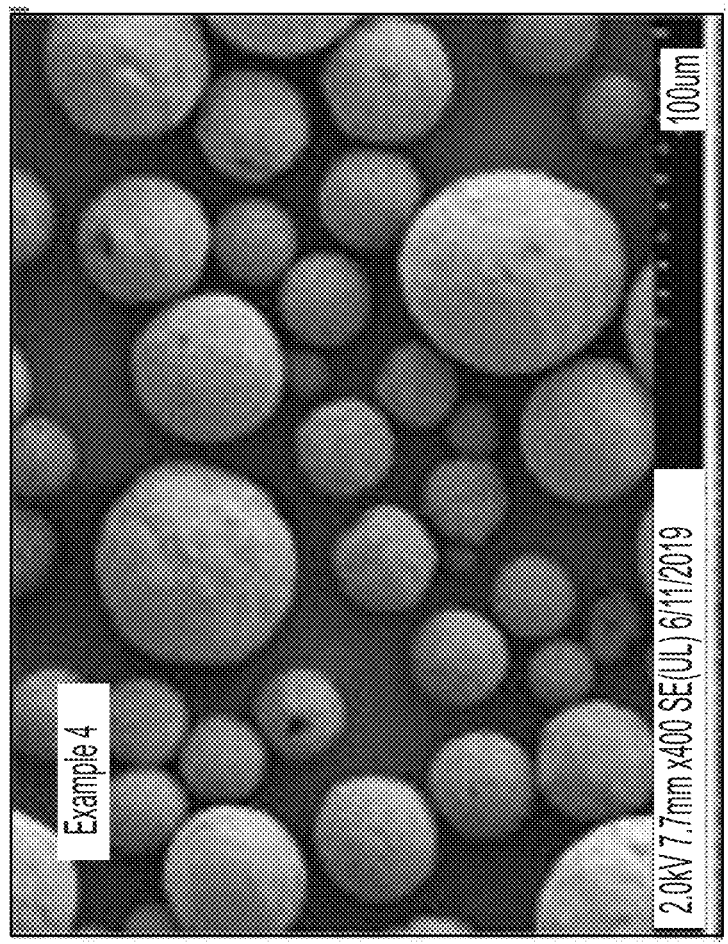
FIG. 4 is a scanning electron microscope image of the polyamide particulates prepared in accordance with Example 4.
Figure 5:
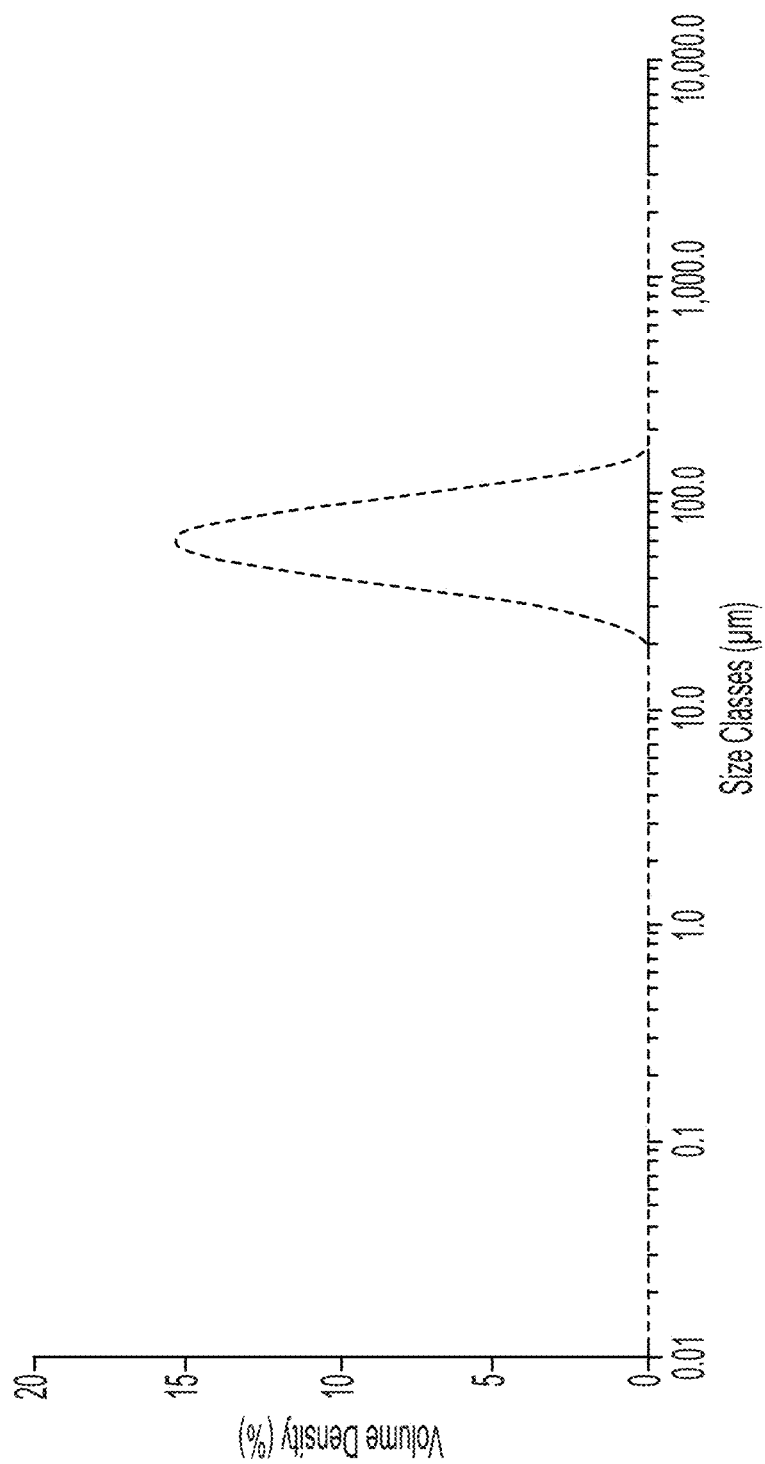
FIG. 5 is a graph showing the particle size distribution of the polyamide particulates prepared in accordance with Example 4.

Example 4: Polyamide Particulates Coated with 1.0 Wt. % Fluorinated Polymer Nanoparticles. A 2 L Buchi reactor was loaded with PDMS oil having a viscosity of 40,000 cSt (blend of 41.5% 30,000 cSt and 58.5% 60,000 cSt PDMS oils) and pre-mixed with 1.0 wt. % of the fluorinated polymer nanoparticles prepared as above. Polyamide-12 pellets (RTP, Winona, Minnesota) were then added at 30 wt. % relative to the PDMS oil. The reactor was stirred at 200 rpm under $N_2$ purge for 10 minutes and then heated to 250° C. at a rate of 3.6° C./min. The stirring rate was increased to 650 rpm when the temperature reached around 230° C. The melt dispersion was mixed at 650 rpm for an additional 60 minutes after the temperature reached 235° C. Heating and $N_2$ purge were then discontinued, and the stirring rate was lowered to 50 rpm. After cooling to room temperature, the slurry was discharged onto a tray. The resultant polyamide particulates were re-slurred 4 times in heptane and filtered onto Whatman #1 90 mm filter paper to remove the PDMS oil. The polyamide particulates had a $D_{50}$ of about 58.6 microns (span=0.983) after drying to remove solvent. Two batches of particulates were combined and screened through a 250 μm sieve for angle of repose measurements. The angle of repose was 26.2°. FIG. 4 is a scanning electron microscope image of the polyamide particulates prepared in accordance with Example 4. FIG. 5 is a graph showing the particle size distribution of the polymide particulates prepared in accordance with Example 4.

The combined batch of powder particulates were then used for SLS printing using a Snow White printer. Good printing performance was demonstrated in a single layer by sintering at a 138° C. temperature set point and 40% laser power.

Example 5: Polyamide Particulates Coated with 1.5 Wt. % Fluorinated Polymer Nanoparticles. Example 4 was repeated except, 1.5 wt. % of fluorinated polymer nanoparticles were used during melt emulsification, and the PDMS oil had a viscosity of 30,000 cSt. The resultant polyamide particulates had a $D_{50}$ of 45.1 microns (span=1.59) after drying to remove solvent and screening through a 150 μm sieve. The angle of repose was 27.6°.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity.

It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A particulate composition comprising:
a plurality of thermoplastic particulates comprising a thermoplastic polymer, and a plurality of polymer nanoparticles disposed upon an outer surface of the thermoplastic particulates, the polymer nanoparticles comprising a polymer having a higher melting point than the thermoplastic polymer.

2. The particulate composition of claim 1, further comprising:
inorganic nanoparticles disposed upon the outer surface of the thermoplastic particulates, the inorganic nanoparticles comprising a plurality of oxide nanoparticles, carbon black, or any combination thereof.

3. The particulate composition of claim 2, wherein the oxide nanoparticles comprise silica nanoparticles.

4. The particulate composition of claim 1, wherein the thermoplastic particulates comprise about 0.01 wt. % to about 10 wt. % polymer nanoparticles, as measured relative to the thermoplastic polymer.

5. The particulate composition of claim 1, wherein the thermoplastic particulates have a sphericity of about 0.9 or greater and a $D_{50}$ ranging from about 1 μm to about 1,000 μm.

6. The particulate composition of claim 1, wherein the polymer nanoparticles range from about 5 nm to about 500 nm in size.

7. The particulate composition of claim 1, wherein the polymer nanoparticles comprise a crosslinked fluorinated polymer.

8. The particulate composition of claim 7, wherein the crosslinked fluorinated polymer comprises a fluorinated (meth)acrylic monomer and a divinyl crosslinker.

9. A method comprising:
providing the particulate composition of claim 1;
depositing the particulate composition layer-by-layer in a powder bed; and
heating a portion of the powder bed to consolidate a portion of the thermoplastic particulates into a consolidated part having a specified shape.

10. The method of claim 9, wherein heating takes place by selective laser sintering.

11. The method of claim 9, wherein the polymer nanoparticles remain associated with the consolidated part.

12. A consolidated part prepared by the method of claim 9, the consolidated part comprising:
a thermoplastic matrix formed by consolidation of the thermoplastic particulates; and
polymer nanoparticles admixed with the thermoplastic matrix.

13. A method comprising:
combining a thermoplastic polymer and polymer nanoparticles with a carrier fluid at a heating temperature at or above a melting point or softening temperature of the thermoplastic polymer and below a melting point, softening temperature or decomposition temperature of the polymer nanoparticles;
wherein the thermoplastic polymer and the polymer nanoparticles have less than 1 wt. % solubility in the carrier fluid at the heating temperature, and the polymer nanoparticles comprise a polymer having a melting point higher than the thermoplastic polymer;
applying shear to disperse the thermoplastic polymer as liquefied droplets in the carrier fluid at the heating temperature in the presence of the polymer nanoparticles;
after liquefied droplets have formed, cooling the carrier fluid to at least a temperature at which thermoplastic particulates in a solidified state form, the thermoplastic particulates comprising the thermoplastic polymer and at least a portion of the polymer nanoparticles disposed upon an outer surface of the thermoplastic particulates; and
separating the thermoplastic particulates from the carrier fluid.

14. The method of claim 13, further comprising:
combining inorganic nanoparticles with the carrier fluid, the inorganic nanoparticles comprising a plurality of oxide nanoparticles, carbon black, or any combination thereof;
wherein at least a portion of the inorganic nanoparticles are disposed upon the outer surface of the thermoplastic particulates.

15. The method of claim 14, wherein the oxide nanoparticles comprise silica nanoparticles.

16. The method of claim 13, wherein the thermoplastic particulates comprise about 0.01 wt. % to about 10 wt. % polymer nanoparticles, as measured relative to the thermoplastic polymer.

17. The method of claim 13, wherein the thermoplastic particulates have a sphericity of about 0.9 or greater and a $D_{50}$ ranging from about 1 μm to about 1,000 μm.

18. The method of claim 13, wherein the polymer nanoparticles range from about 5 nm to about 500 nm in size.

19. The method of claim 13, wherein the polymer nanoparticles comprise a crosslinked fluorinated polymer.

* * * * *